United States Patent
Lee (10) Patent No.: US 8,848,055 B2
(45) Date of Patent: Sep. 30, 2014

(54) OBJECT RECOGNITION SYSTEM, AND OBSTACLE RECOGNITION SYSTEM AND METHOD FOR VEHICLE

(75) Inventor: Hong Seok Lee, Incheon (KR)

(73) Assignee: Hyundai Mobis Co., Ltd., Yongin-si (KR)

( * ) Notice: Subject to any disclaimer, the term of this patent is extended or adjusted under 35 U.S.C. 154(b) by 355 days.

(21) Appl. No.: 13/031,935

(22) Filed: Feb. 22, 2011

(65) Prior Publication Data

US 2012/0127309 A1    May 24, 2012

(30) Foreign Application Priority Data

Nov. 23, 2010  (KR) .......... 10-2010-0116980

(51) Int. Cl.
*H04N 7/18* (2006.01)
*G06K 9/32* (2006.01)
*G06K 9/00* (2006.01)
*G06K 9/46* (2006.01)

(52) U.S. Cl.
CPC .......... *G06K 9/00805* (2013.01); *G06K 9/3233* (2013.01); *G06K 9/4642* (2013.01); *H04N 7/18* (2013.01)
USPC .......................................... 348/148; 348/143

(58) Field of Classification Search
CPC .......................................................... H04N 7/81
USPC ................................................. 348/143–160
See application file for complete search history.

(56) References Cited

U.S. PATENT DOCUMENTS

| | | | | |
|---|---|---|---|---|
| 6,130,706 | A  * | 10/2000 | Hart et al. ...................... | 348/148 |
| 6,834,232 | B1 * | 12/2004 | Malhotra ....................... | 701/301 |
| 8,108,119 | B2 * | 1/2012 | Southall et al. .................. | 701/96 |
| 2008/0221767 | A1 * | 9/2008 | Ikeda et al. ...................... | 701/70 |
| 2011/0093306 | A1 * | 4/2011 | Nielsen et al. ............... | 705/7.13 |

* cited by examiner

*Primary Examiner* — Richard Torrente
*Assistant Examiner* — Frank Huang
(74) *Attorney, Agent, or Firm* — NSIP Law (57) ABSTRACT

Provided is an object recognition system. The object recognition system recognizes an object in an ROI of a source image. The object recognition system includes an image change unit and an ROI detection unit. The image change unit receives the source image, and changes the object into an edge image which is represented as an edge line. The ROI detection unit divides the edge image into a plurality of regions, compares a total sum of edge component values of an edge line included in each of the regions and a predetermined threshold value by regions, and detects a region, in which the total sum of edge component values is greater than the threshold value, as the ROI from among the plurality of regions.

6 Claims, 8 Drawing Sheets

OBJECT RECOGNITION SYSTEM, AND OBSTACLE RECOGNITION SYSTEM AND METHOD FOR VEHICLE

CROSS-REFERENCE TO RELATED APPLICATIONS

This application claims priority under 35 U.S.C. §119 to Korean Patent Application No. 10-2010-0116980, filed on Nov. 23, 2010, in the Korean Intellectual Property Office, the disclosure of which is incorporated herein by reference in its entirety.

TECHNICAL FIELD

The following disclosure relates to an object recognition system and an obstacle recognition system and method for vehicle, and in particular, to an object recognition system which recognizes an object included in an image in an image processing technology, and to an obstacle recognition system and method for vehicle.

BACKGROUND

An object recognition algorithm is being applied to various fields such as a user authentication system, an obstacle recognition system for vehicle, a security system and a Human Robot Interaction (HRI) technology. Recently, the object recognition algorithm is built into hardware and is implemented as an embedded system that performs only a special function. Herein, the embedded system is a portion of a large system, and is a specific application system that includes hardware and software for performing a special task.

However, the object recognition algorithm requires an excessive operation processing amount to a processor. For example, the object recognition algorithm includes an operation that scans the entire region of an input image to a searching window having a certain size, and the scanning operation requires an excessive operation processing amount. Due to the excessive operation processing amount, a memory necessary for processing of an image is added. Moreover, the excessive operation processing amount and the added memory are factors that disturb the object recognition algorithm to be implemented in hardware such as an embedded system.

SUMMARY

Accordingly, the present disclosure provides an object recognition system, which does not require an excessive operation processing amount in an image processing operation for object recognition.

The present disclosure also provides an obstacle recognition system for vehicle using the object recognition system.

The present disclosure also provides an obstacle recognition method for vehicle, which does not require an excessive operation processing amount in an image processing operation for obstacle recognition.

In one general aspect, an object recognition system, which recognizes an object in a Region Of Interest (ROI) of a source image, includes: an image change unit receiving the source image, and changing the object into an edge image which is represented as an edge line; and an ROI detection unit dividing the edge image into a plurality of regions, comparing a total sum of edge component values of an edge line included in each of the regions and a predetermined threshold value by regions, and detecting a region, in which the total sum of edge component values is greater than the threshold value, as the ROI from among the plurality of regions.

In another general aspect, an obstacle recognition system for vehicle includes: an image photographing unit included in a vehicle, and generating a source image which is obtained by photographing a front view and a rear view while the vehicle is driving; an edge image generation unit receiving the source image, and generating an edge image which represents an object included in the source image as an edge line; a Region Of Interest (ROI) detection unit dividing the edge image into a plurality of regions, calculating a total sum of edge component values of the edge line for each region, comparing the total sum of edge component values and a predetermined threshold value, and detecting an ROI from the regions on the basis of the compared result for each region; and an image analysis unit scanning the detected ROI by block units having a certain size to analyze whether an obstacle exists in the detected ROI.

In another general aspect, an obstacle recognition system for vehicle includes: an image photographing unit included in a vehicle, and generating a source image which is obtained by photographing a front view and a rear view while the vehicle is driving; an edge image generation unit receiving the source image, and generating an edge image which represents an object included in the source image as an edge line; a Region Of Interest (ROI) detection unit dividing the edge image into a predetermined number of regions according to a speed value of the vehicle, calculating a total sum of edge component values of the edge line for each region, comparing the total sum of edge component values and a predetermined threshold value for each region, and detecting an ROI from the regions on the basis of the compared result for each region; and an image analysis unit scanning the detected ROI by block units having a certain size to analyze whether an obstacle exists in the detected ROI.

In another general aspect, an obstacle recognition method for vehicle, which scans a Region Of Interest (ROI) detected from a source image by block units having a certain size to recognize an obstacle, includes: generating an edge image which represents an object included in the source image as an edge line; dividing the edge image into a predetermined number of regions according to a speed value of the vehicle; and calculating a total sum of edge component values of an edge line which exists in each of the divide regions, comparing the total sum of the edge component values and a predetermined threshold value, and detecting an ROI from the regions on the basis of the compared result for each region.

Other features and aspects will be apparent from the following detailed description, the drawings, and the claims.

DETAILED DESCRIPTION OF EMBODIMENTS

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

The present invention analyzes a source image that is provided from an imaging device such as a camera, and largely improves the detection performance of an object included in the source image on the basis of the analyzed result.

For this, the present invention performs an object detecting operation for only a portion of the entire region of the source image, unlike the existing method that detects an object such as an obstacle from the entire region of a source image.

Before a detailed description on exemplary embodiments of the present invention, for understanding, an example will be described below where an object recognition system according to exemplary embodiments of the present invention is applied to a vehicle and is used as an obstacle recognition apparatus for recognizing an obstacle (or an object) such as an adjacent vehicle or a pedestrian. In consideration of such application example, the term "object recognition system" is replaced by the term "obstacle recognition system for vehicle", in the accompanying drawings.

However, the object recognition system according to exemplary embodiments of the present invention is not limited to an obstacle recognition means for vehicle. On the contrary, it can be understood through the following description that the object recognition system according to exemplary embodiments of the present invention may be applied to various image processing technologies for object recognition such as a user authentication system, a security system and an HRI technology.

Figure 7:
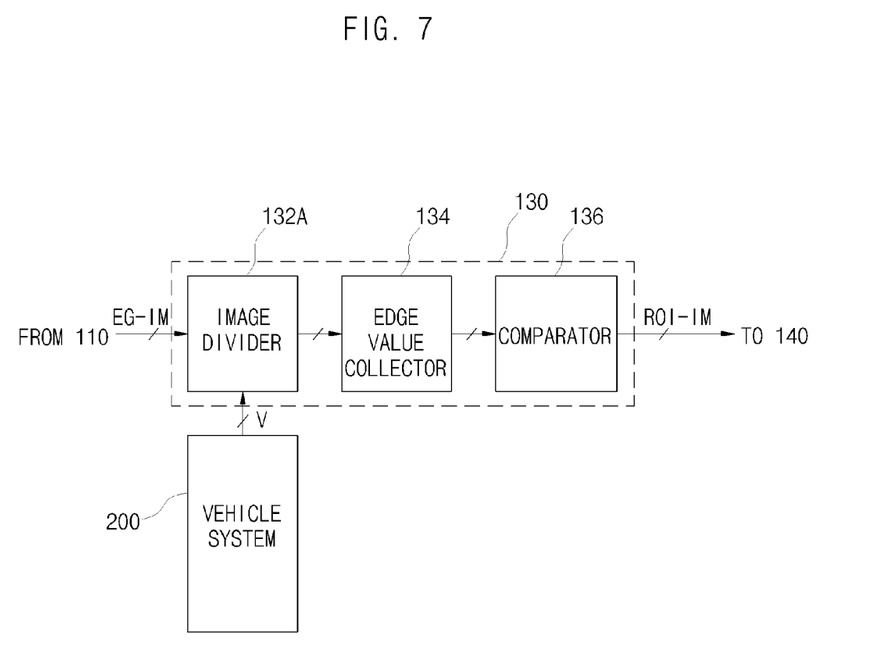
FIG. 7 is a block diagram illustrating another exemplary embodiment of an internal configuration of an ROI detection unit in FIG. 1.

In the following description, when the detailed description of the relevant known function or configuration is determined to unnecessarily obscure the important point of the present invention, the detailed description will be omitted. Like reference numerals refer to like elements throughout. The edge value collector of FIG. 4 and the comparator of FIG. 7 are indicated by the same reference numeral.

Figure 1:
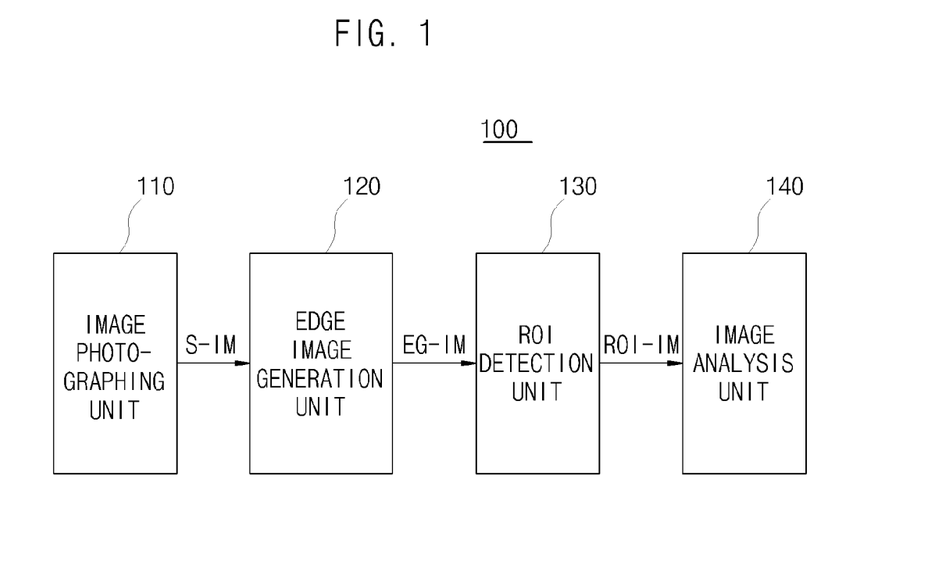
FIG. 1 is a block diagram illustrating an obstacle recognition system for vehicle according to an exemplary embodiment of the present invention.
Figure 2:
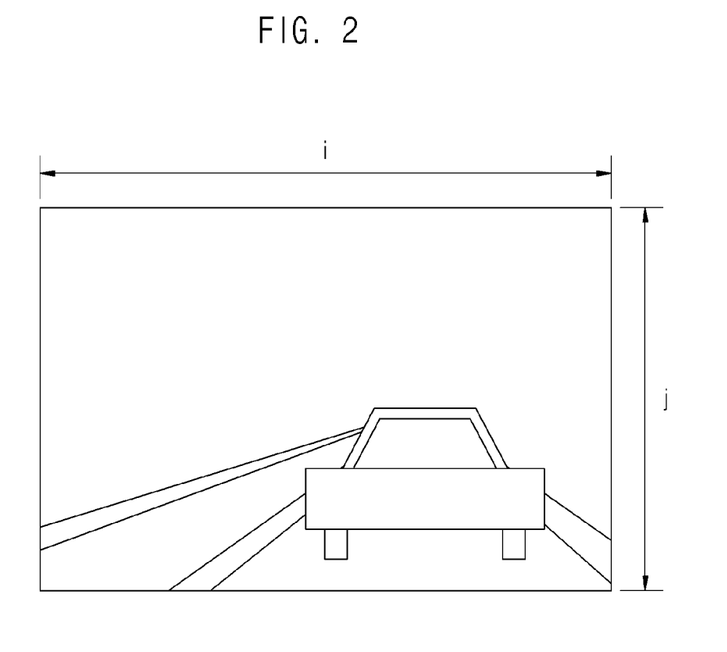
FIG. 2 is a diagram illustrating an example of a source image which is photographed by an image photographing unit of FIG. 1.
Figure 3:
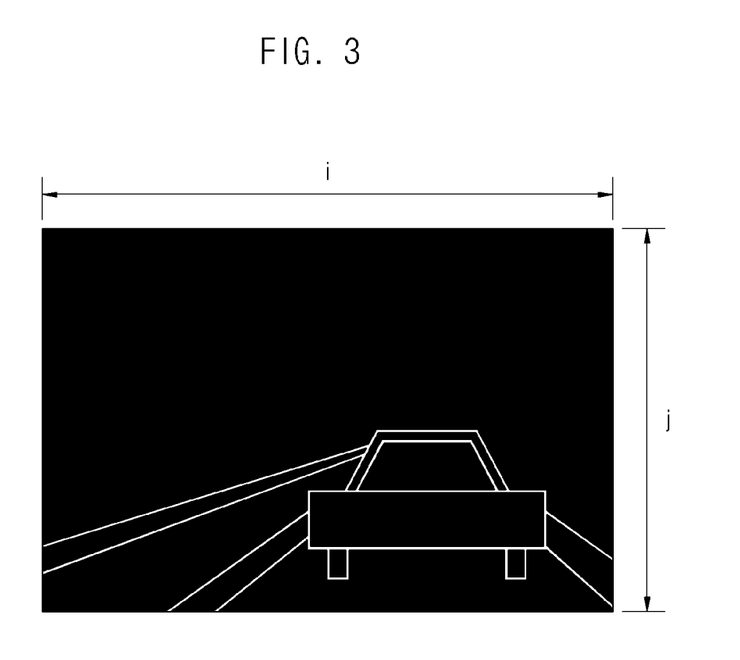
FIG. 3 is a diagram illustrating an example of an edge image which is generated by an edge image generation unit of FIG. 1.

FIG. 1 is a block diagram illustrating an obstacle recognition system 100 for vehicle according to an exemplary embodiment of the present invention. FIG. 2 is a diagram illustrating an example of a source image which is photographed by an image photographing unit of FIG. 1. FIG. 3 is a diagram illustrating an example of an edge image which is generated by an edge image generation unit of FIG. 1. In FIG. 2, 'i' as a variable indicating the horizontal length of a source image is the number of pixels in the horizontal direction, and 'j' as a variable indicating the vertical length of the source image is the number of pixels in the vertical direction. In FIG. 3, 'i' as a variable indicating the horizontal length of an edge image is the number of pixels in the horizontal direction, and 'j' as a variable indicating the vertical length of the edge image is the number of pixels in the vertical direction.

Referring to FIG. 1, an obstacle recognition system 100 for vehicle according to an exemplary embodiment of the present invention detects an obstacle (or an object) such as a vehicle or a pedestrian. Above all, the obstacle recognition system 100 sets a partial region of the entire region of a source image as a Region Of Interest (ROI), and performs a scanning operation only for the set ROI.

The obstacle recognition system 100 restricts an analysis target region to a partial region in the entire region of the source image, and thus an image processing target is reduced from the entire region of the source region to a partial region. Therefore, the operation processing amount of a processor decreases, and moreover, a memory capacity necessary for an image processing operation is reduced. For this, the obstacle recognition system 100 includes an image photographing unit 110, an edge image generation unit 120, an ROI detection unit 130, and an image analysis unit 140.

The image photographing unit 110 is an imaging device such as an infrared camera and is disposed in a specific position of a vehicle. The image photographing unit 110 generates a source image S-IM that is obtained by photographing the front view and/or rear view of the vehicle while the vehicle is driving.

The edge image generation unit 120 receives the source image S-IM from the image photographing unit 110. The edge image generation unit 120 generates an edge image EG-IM that represents an obstacle (for example, a vehicle or a pedestrian) included in the source image S-IM as an edge line. For this, the edge image generation unit 110 generates the edge image EG-IM in an edge detection technique. The edge detection technique is an algorithm that detects an edge component value which configures the edge line of the obstacle (for example, a vehicle or a pedestrian) included in the source image S-IM by using an edge operator. Herein, an arbitrary pixel among pixels configuring the edge line and a pixel adjacent to the arbitrary pixel are designated, and the edge component value denotes a discontinuous value between the gray scale value of the arbitrary pixel and the gray scale value of the adjacent pixel. The discontinuous value may be defined as a difference value between the gray scale value of the arbitrary pixel and the gray scale value of the adjacent pixel or the numerical value of a change rate between the gray scale value of the arbitrary pixel and the gray scale value of the adjacent pixel.

The discontinuous value may be detected with an edge operator. As the edge operator, for example, there may be a homogeneity operator, a difference operator, a differential operator, a compass gradient operator, a Laplacian operator, and a Laplacian of Gaussian (LOG) operator.

In an operation that detects the edge line (or the edge component value) from the source image S-IM, even the noise of the source image S-IM may be detected as the edge line (or the edge component). Therefore, the edge image generation unit 110 changes the source image S-IM of FIG. 2 into an intermediate image that is composed of the edge line of the object, and thereafter it binarizes the changed intermediate image to finally generate a binarized edge image EG-IM of FIG. 3 from which noise has been removed. For example, the edge image generation unit 110 gives a gray scale value of 255 (or a binary bit of 1) to pixels that configure the edge line of the obstacle (or the object), and it gives a gray scale value of 0 (or a binary bit of 0) to pixels other than pixels that configure the edge line of the obstacle. As a result, as shown in FIG. 3, the edge image generation unit 110 finally generates the binarized edge image EG-IM having a grey gray scale that includes a black gray scale and a white gray scale.

The ROI detection unit 130 divides the entire region of the edge image EG-IM, which is inputted from the edge image generation unit 120, into a plurality of regions. The ROI detection unit 130 selects a region satisfying a specific condition (which will be described below) from among the divided regions and detects the selected region as an ROI. An ROI image ROI-IM corresponding to the detected ROI is provided to the image analysis unit 140. The ROI detection unit 130 will be described below in detail.

The image analysis unit 140 receives the ROI image ROI-IM from the ROI detection unit 130, and scans the entire region of the ROI image ROI-IM in a scheme that moves a searching window having a certain size by one pixel from the left to the right. When the movement of the searching window is reached from the left upper end of the ROI image ROI-IM to the right lower end of the ROI image ROI-IM, a scanning operation of one cycle is completed.

When the scanning operation of one cycle is completed, the image analysis unit 140 scales down the size of the ROI image and repeats the scanning operation. An image analysis operation is performed through the repeated scanning operation. Since such a scanning operation is an operation that is repeated while controlling the size of an image, it requires very much data processing amount and a large memory capacity.

In an exemplary embodiment of the present invention, however, the scanning operation is performed only for a partial region satisfying a specific condition among the entire region of the edge image EG-IM, instead of scanning the entire region of the edge image EG-IM.

Figure 4:
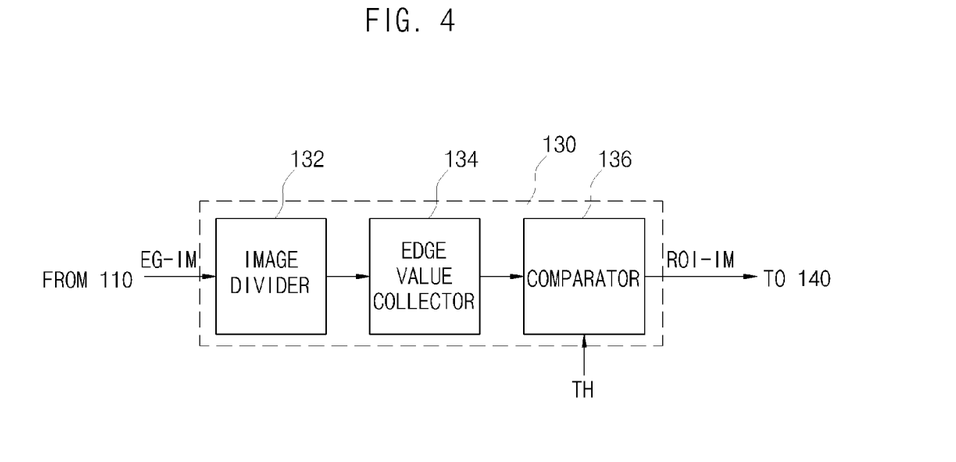
FIG. 4 is a block diagram illustrating an exemplary embodiment of an internal configuration of an ROI detection unit in FIG. 1.
Figure 5:
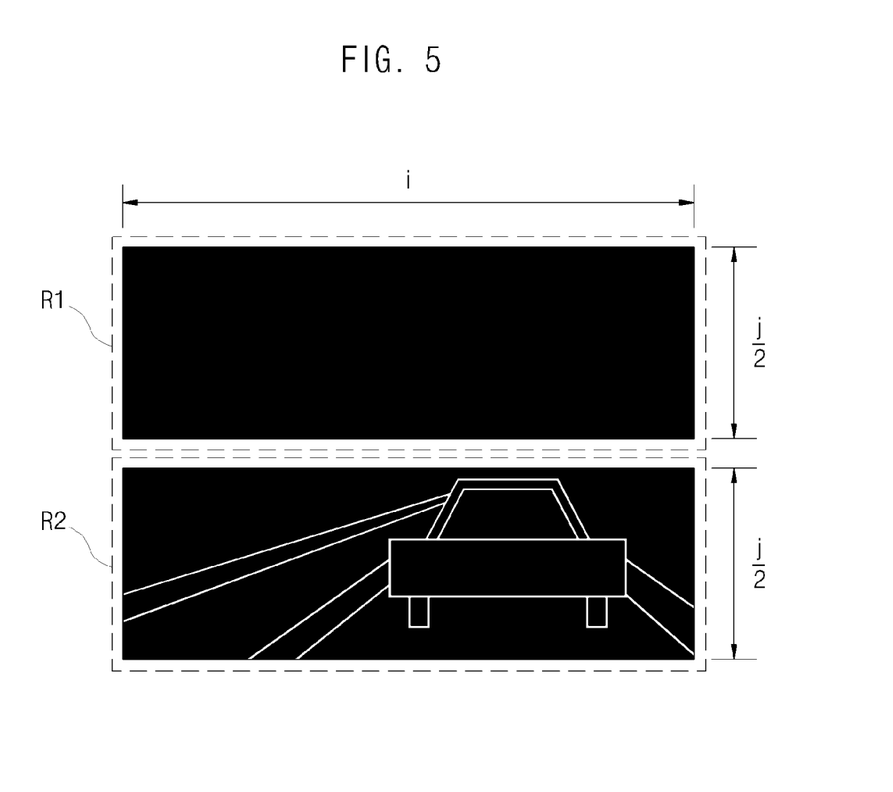
FIGS. 5 and 6 are diagrams illustrating an example of an edge image which is divided by an image divider of FIG. 4.
Figure 6:
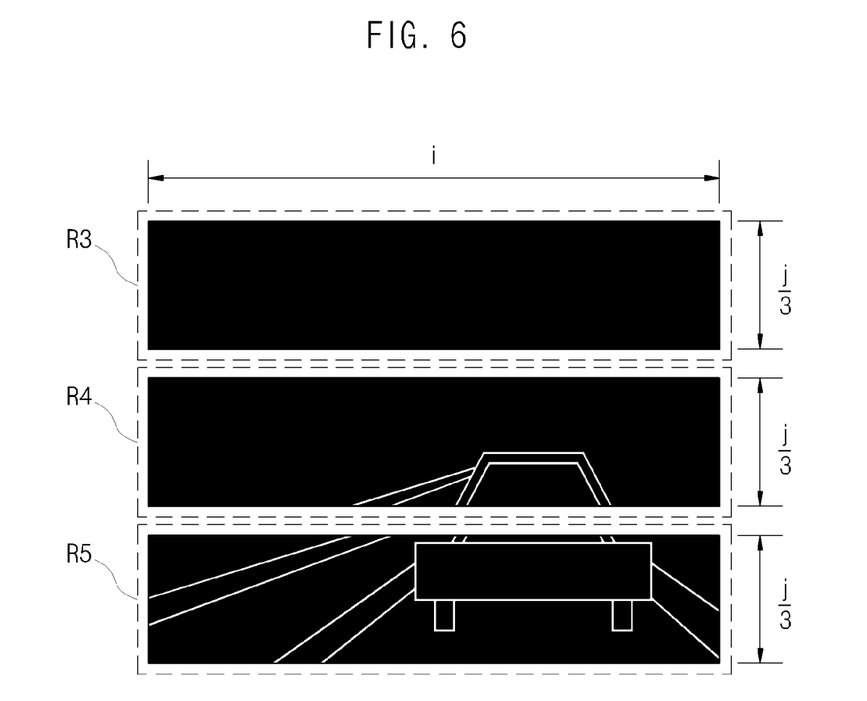

FIG. 4 is a block diagram illustrating an exemplary embodiment of an internal configuration of the ROI detection unit in FIG. 1. FIGS. 5 and 6 are diagrams illustrating an example of an edge image which is divided by an image divider of FIG. 4.

Referring to FIG. 4, the ROI detection unit 130 detects a partial region of the entire region of the edge image EG-IM as an ROI, and includes a region divider 132, an edge value collector 134 and a comparator 136.

The region divider 132 divides the entire region of the edge image EG-IM into a plurality of regions. The region divider 132 divides the entire region of the edge image EG-IM into n equal portions (where n is a natural number equal to or more than 2) in the horizontal direction to divide into the plurality of regions.

When an obstacle exists in a source image that is obtained by photographing the front view or rear view of a vehicle, it is disposed in the horizontal direction in the entire region of the edge image EG-IM. In an exemplary embodiment of the present invention, therefore, the entire region of the edge image EG-IM is divided into n equal portions (where n is a natural number equal to or more than two) in the horizontal direction, for increasing the detection success rate and division efficiency of an object in the edge image.

As shown in FIG. 3, when the entire size of the edge image EG-IM is "i*j", the size of each of the divided regions is "i*(j/n)". Herein, 'i' as the horizontal length of the edge image is the number of pixels in the horizontal direction, and 'j' as the vertical length of the edge image is the number of pixels in the vertical direction. 'n' is a variable for determining the number of regions that are divided in the horizontal direction and is a natural number from two to five. The variable 'n' may be variously set by a system designer.

FIGS. 5 and 6 illustrate examples of an edge image that is divided by the image divider 132. FIG. 5 illustrates the entire region of the edge image that is divided into two equal portions, in which case the variable 'n' is set as two. FIG. 6 illustrates the entire region of the edge image that is divided into three equal portions, in which case the variable 'n' is set as three.

Referring again to FIG. 4, the edge value collector 134 calculates the total sum (hereinafter, a CET value) of edge component values of the edge line that is included in each of the regions divided by the image divider 132. The total sum of the edge component values is expressed as Equation (1) below.

$$CET \text{ value} = \Sigma \text{Edge}(i,j) \qquad (1)$$

Subsequently, the edge value collector 134 differentiates and collects the calculated CET values by regions, and provides the collected CET values to the comparator 136.

The comparator 136 compares the CET values received from the edge value collector 134 and a predetermined threshold value (TH) by regions. Herein, the threshold value (TH) is a prediction value that is calculated on the basis of statistic information collected by the system designer. The threshold value (TH) may be differently set according to the number of divided regions. For example, a threshold value when the edge image is divided into two equal portions like FIG. 5 may be set greater than a threshold value when the edge image is divided into three equal portions like FIG. 6. On the contrary, a threshold value when the edge image is divided into two equal portions like FIG. 5 may be set less than a threshold value when the edge image is divided into three equal portions like FIG. 6.

Based on the compared result for each region, the comparator 136 detects a region, in which a CET value is greater than the threshold value (TH), as an ROI. For example, as shown in FIG. 5, when the edge image is divided into a first region R1 and a second region R2 as two equal portions, the CET value of the first region R1 is less than the threshold value (TH) because an obstacle does not exist in the first region R1, and thus the first region R1 is excluded from an ROI. On the other hand, since an obstacle such as a vehicle exists in the second region R2, the CET value of the second region R2 is greater than the threshold value (TH), and thus the second region R2 is detected as an ROI. Similarly with this, fourth and fifth regions R4 and R5 other than a third region R3 are detected as ROIs.

Subsequently, the ROI detected by the comparator 136 is outputted to the image analysis unit 140. The image analysis unit 140 performs a scanning operation only for the ROI inputted from the comparator 136, and thus total image processing speed is enhanced.

FIG. 7 is a block diagram illustrating another exemplary embodiment of an internal configuration of the ROI detection unit in FIG. 1.

Referring to FIG. 7, an ROI detection unit 130 according to another exemplary embodiment of the present invention has a function different from the ROI detection unit of FIG. 6 in that it divides the entire region of an edge image by a predetermined number according to the speed value of a vehicle.

Specifically, the ROI detection unit 130 according to another exemplary embodiment of the present invention includes a region divider 132A, an edge value collector 134, and a comparator 136. The region divider 132A receives a speed value from a vehicle system 200, and adaptively controls the number of divided regions among the entire region of the edge image according to the received speed value.

As the speed of the vehicle increases, a rate occupied by an obstacle increases in the entire region of the edge image. That is, as the speed of the vehicle increases, the rate of a region of uninterest decreases in the entire region.

When the entire region of the edge image is divided into equal portions irrespective of a vehicle speed, a region to be determined as an ROI is determined as a region of uninterest, and thus a detection error may occur in an operation of detecting the ROI.

For example, in a case where a design has been made by the system designer in order for an edge image to be divided into two equal portions, as shown in FIG. 5, an obstacle exists in the second region R2 when an edge image is divided in a user's vehicle that is driving at 80 Km/h, and thus the second region R2 may be detected as an ROI according to the comparing operation of the comparator 136.

Even in a case where the user's vehicle increases a driving speed to more than 100 Km/h, a rate where the size of an obstacle vehicle that is driving ahead occupies the entire region of the edge image also increases due to the increase in speed of the vehicle. Therefore, a portion of an edge line representing an obstacle vehicle may be shown even in the first region R1. In this case, when the CET value of the first region R1 is less than the predetermined threshold value (TH) as the calculated result of the edge value collector 134 in FIG. 4, a detection error where the first region R1 is excluded from an ROI may occur. Accordingly, when speed of the vehicle increases, an operation of accurately analyzing the entire region of the edge image is required.

The region divider 132A of the ROI detection unit 130 according to another exemplary embodiment of the present invention receives the speed value (V) of the vehicle from the vehicle system 200 in real time, and when the received speed value (V) of the vehicle increases, the region divider 132A increases the number of divided regions in the entire region of the edge image.

That is, as described above, when the entire size of an edge image is "i*j" and the size of each of regions that are generated by dividing the edge image in the horizontal direction is "i*(j/n)", the region divider 132A increases the variable 'n' in proportion to the speed value (V) of the vehicle and divides the entire region of the edge image. The description of FIG. 6 will be applied to an operation that is performed after the edge image that has been divided according to the speed value (V) of the vehicle.

Figure 8:
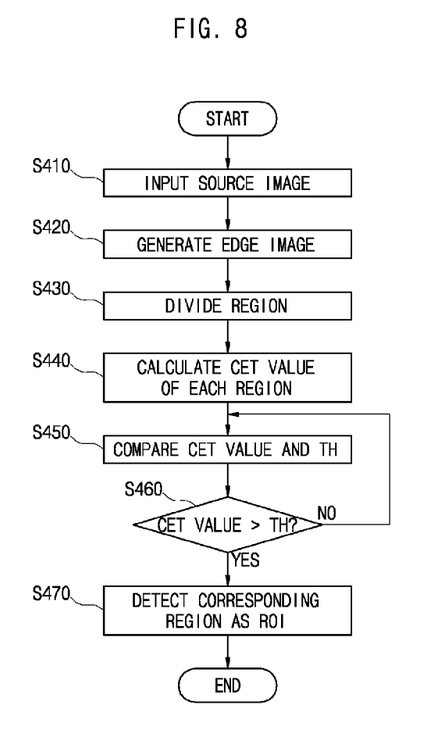
FIG. 8 is a flowchart illustrating an obstacle recognition method according to an exemplary embodiment of the present invention.

FIG. 8 is a flowchart illustrating an obstacle recognition method according to an exemplary embodiment of the present invention.

Referring to FIG. 8, the obstacle recognition method generates a source image that is obtained by photographing the front view or rear view of a vehicle with an image device disposed in the vehicle in operation S410.

In operation S420, the obstacle recognition method generates an edge image that represents the obstacle (or object) of the source image as an edge line, in the edge detection technique.

The obstacle recognition method performs an operation of dividing the entire region of the edge image in operation S430. In the dividing operation, the edge image may be divided into n equal portions, and 'n' may be set a natural number from two to five. In operations after operation S430, for understanding, it is assumed that 'n' is two, i.e., the entire region of the edge image is divided into two equal portions, and moreover, for convenience, divided regions are respectively referred to as an upper region (which is R1 of FIG. 5) and a lower region (which is R2 of FIG. 5).

In operation S440, the obstacle recognition method calculates the total sum (hereinafter referred to as a first CET value) of edge component values of an edge line included in the upper region R1, and the total sum (hereinafter referred to as a second CET value) of edge component values of an edge line included in the lower region R2.

The obstacle recognition method compares the first and second CET values with a predetermined threshold value (TH) in operation S450. When the first CET value is less than the threshold value (TH), the upper region corresponding to the first CET value is excluded from an ROI in operation S460, and the obstacle recognition method compares the second CET value and the threshold value (TH) in operation S450. When the second CET value is greater than the threshold value (TH) in operation S460, an image which pertains to the lower region corresponding to the second CET value is detected as an ROI in operation S470.

Subsequently, an image analyzing operation such as a scanning operation is performed only for the lower region that has been detected as the ROI.

According to exemplary embodiments of the present invention, the image processing operation for recognizing an object is performed only in a partial region of the source image, unlike the existing method in which an image processing operation is performed in the entire region of a source image. Accordingly, the operation processing amount of the processor decreases, and a memory capacity necessary for the image processing operation is reduced. When the system and method according to exemplary embodiments of the present invention are implemented in hardware such as an embedded system, excellent processing performance is guaranteed without the decrease in a processing speed.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An obstacle recognition system for a vehicle, comprising:
   an image photographing unit comprised in the vehicle, and configured to generate a single source image which is obtained by photographing a front view or a rear view while the vehicle is driving;
   an edge image generation unit configured to receive the source image, and generate an edge image which represents an object comprised in the source image as an edge line;
   a region of interest (ROI) detection unit configured to divide the edge image into a predetermined number of regions according to a speed value of the vehicle, calculate a total sum of edge component values of the edge line for each region, compare the total sum of edge component values of each of the regions and a predetermined threshold value for each of the regions, and detect a region from the number of regions as an ROI that provides information of the object in front of the vehicle on the basis of the compared result for each of the regions; and an image analysis unit configured to scan the detected ROI by block units having a certain size to analyze whether an obstacle exists in the detected ROI, wherein the ROI detection unit comprises:

an image divider configured to receive the speed value of the vehicle from a vehicle system, and divide an entire region of the edge image into a predetermined number of regions according to the received speed value of the vehicle;

an edge value collector configured to calculate a total sum of edge component values of an edge line which is comprised in each of the regions, and collect the calculated total sum of edge component values of each of the regions; and a comparator configured to compare the total sum of edge component values of the edge line of each of the regions and the predetermined threshold value for each region, and detect a region, in which the total sum of edge component values is greater than the threshold value, as the ROI from among the plurality of regions, wherein the image analysis unit is configured to scan only the detected ROI without scanning any other region of the plurality of regions in order to reduce a processing time of the scanning, wherein when an entire size of the edge image is i*j, i being the number of pixels in a horizontal direction, and j being the number of pixels in a vertical direction, a size of each of the divided regions is i*(j/n), n being a natural number from two to six, wherein as a speed of the vehicle increases, the n increases, in order to decrease a detection error occurring in an operation of detecting the ROI when the entire region of the edge image is divided into equal portions irrespective of a vehicle speed.

2. The obstacle recognition system of claim 1, wherein the image divider is configured to receive the speed value of the vehicle from the vehicle system in a controller area network (CAN) communication scheme.

3. The obstacle recognition system of claim 1, wherein the image divider is configured to divide the edge image into n equal portions in a horizontal direction in a predetermined size according to the speed value of the vehicle, n being a natural number equal to or more than 2.

4. The obstacle recognition system of claim 1, wherein the edge image generation unit, the ROI detection unit and the image analysis unit are configured to be modularized in a chip type.

5. An obstacle recognition method for a vehicle which scans a region of interest (ROI) detected from a single source image by block units having a certain size to recognize an obstacle, the obstacle recognition method comprising:

generating an edge image that represents an object comprised in the source image as an edge line;

dividing the edge image into a predetermined number of regions according to a speed value of the vehicle; and calculating a total sum of edge component values of an edge line that exists in each of the divide regions, comparing the total sum of the edge component values and a predetermined threshold value, and detecting a region from the number of regions as a ROI that provides information of the object in front of the vehicle on the basis of the compared result for each of the regions, wherein as the speed value of the vehicle increases, the predetermined number increases in order to reduce a processing time of the scanning and decrease a detection error occurring in an operation of detecting the ROI when the entire region of the edge image is divided into equal portions irrespective of a vehicle speed.

6. The obstacle recognition system of claim 5, wherein the edge image is divided in a horizontal direction.

* * * * *